Aug. 13, 1946.  R. F. LEFTWICH  2,405,893
CARGO TRUCK
Filed Nov. 25, 1944   5 Sheets-Sheet 1
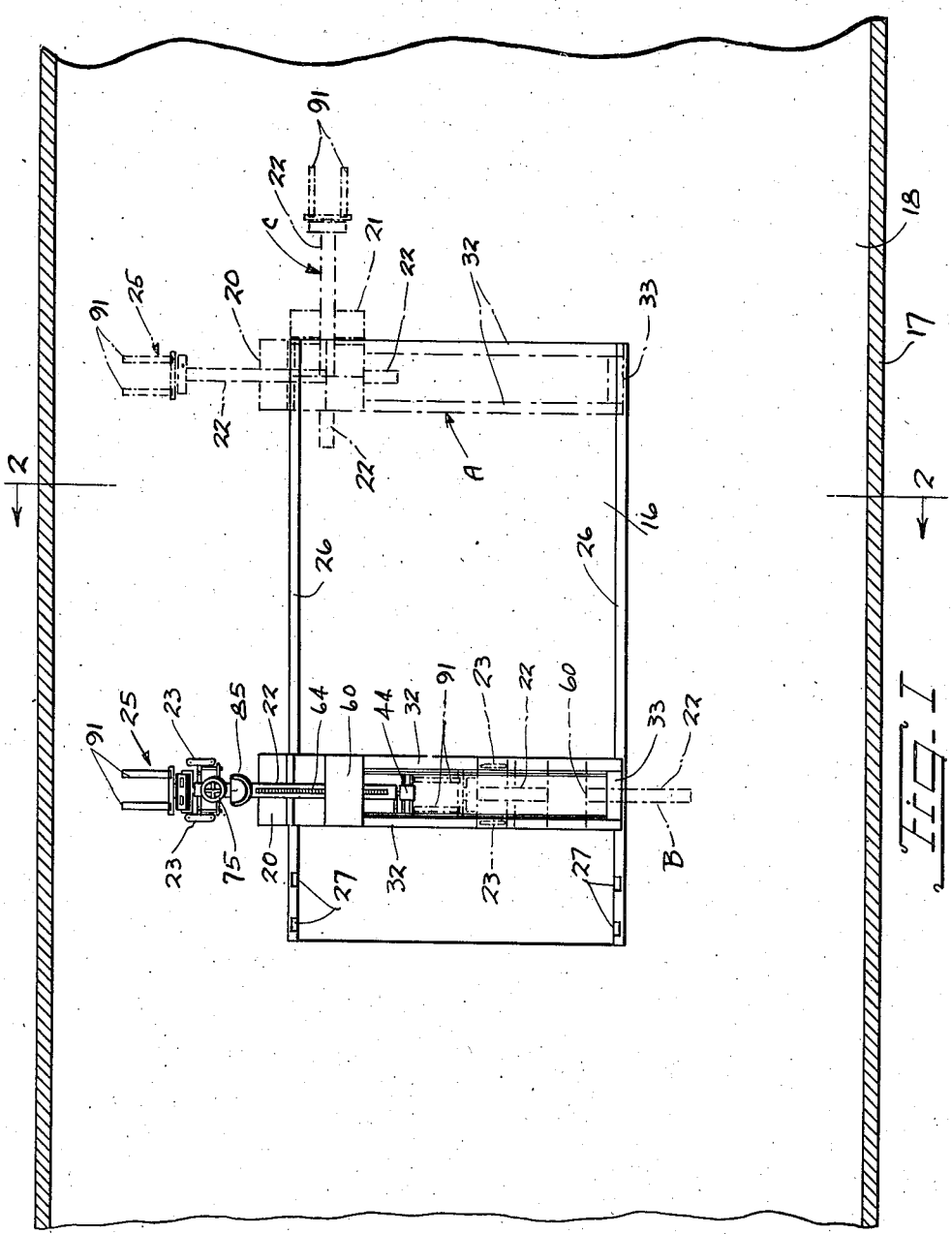
INVENTOR.
ROBERT F. LEFTWICH
BY
ATTORNEY Aug. 13, 1946.  R. F. LEFTWICH  2,405,893
CARGO TRUCK
Filed Nov. 25, 1944  5 Sheets-Sheet 2
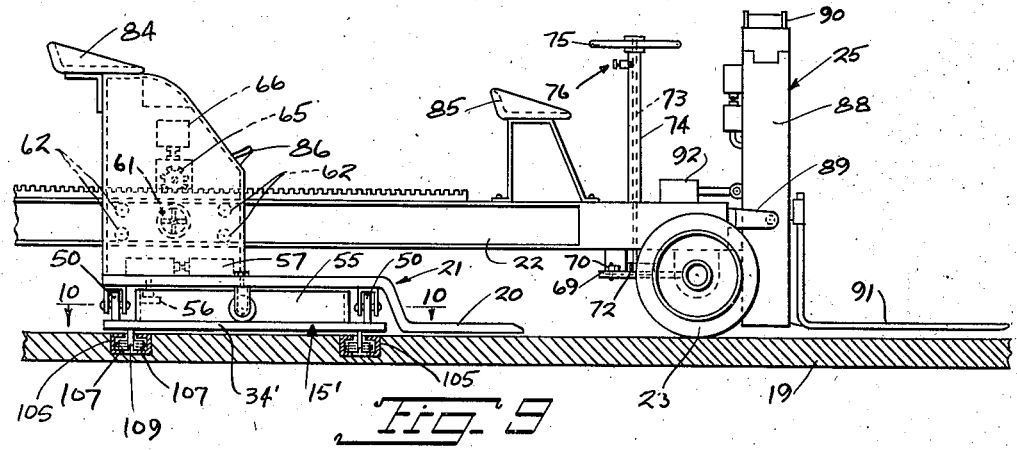
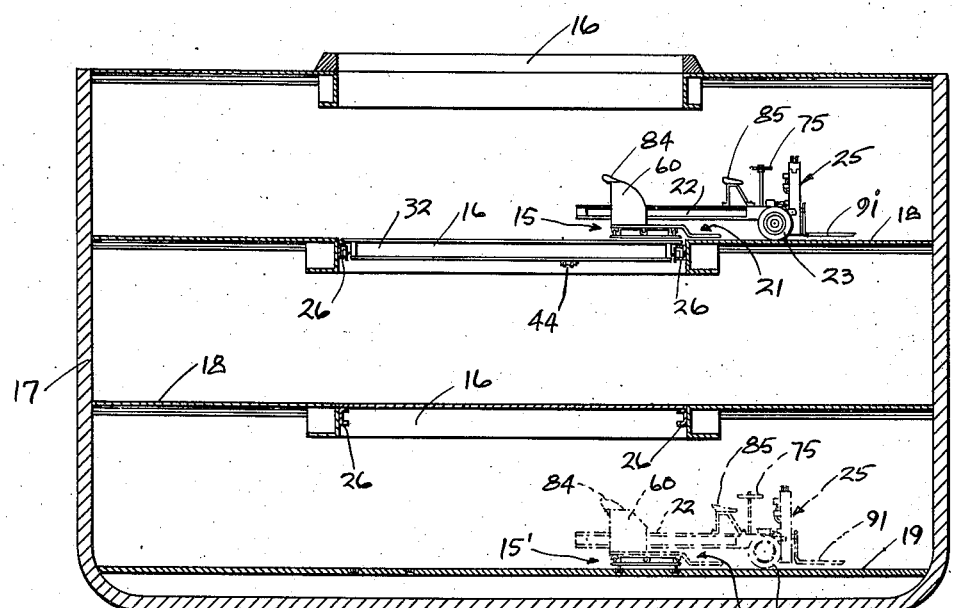
INVENTOR.
ROBERT F. LEFTWICH
BY
ATTORNEY.

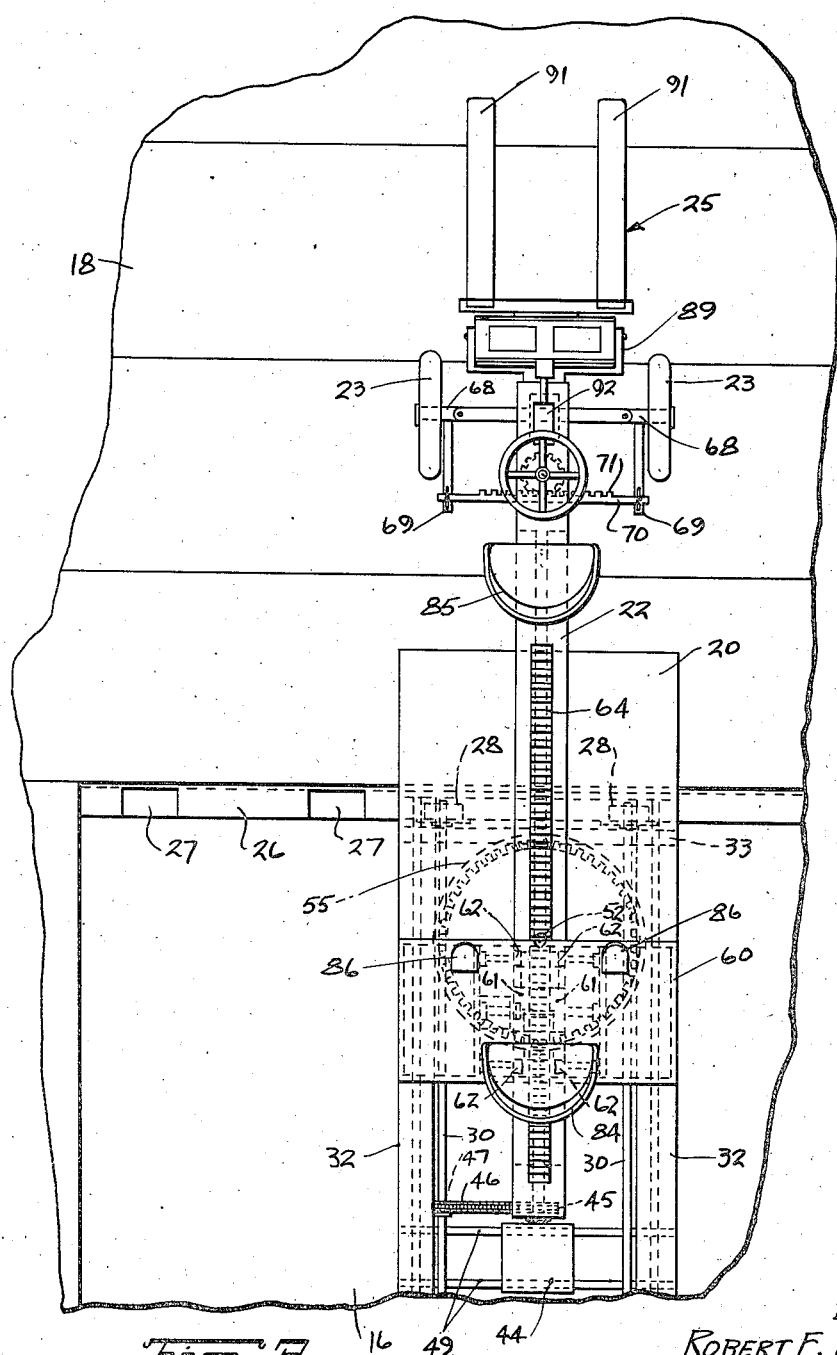

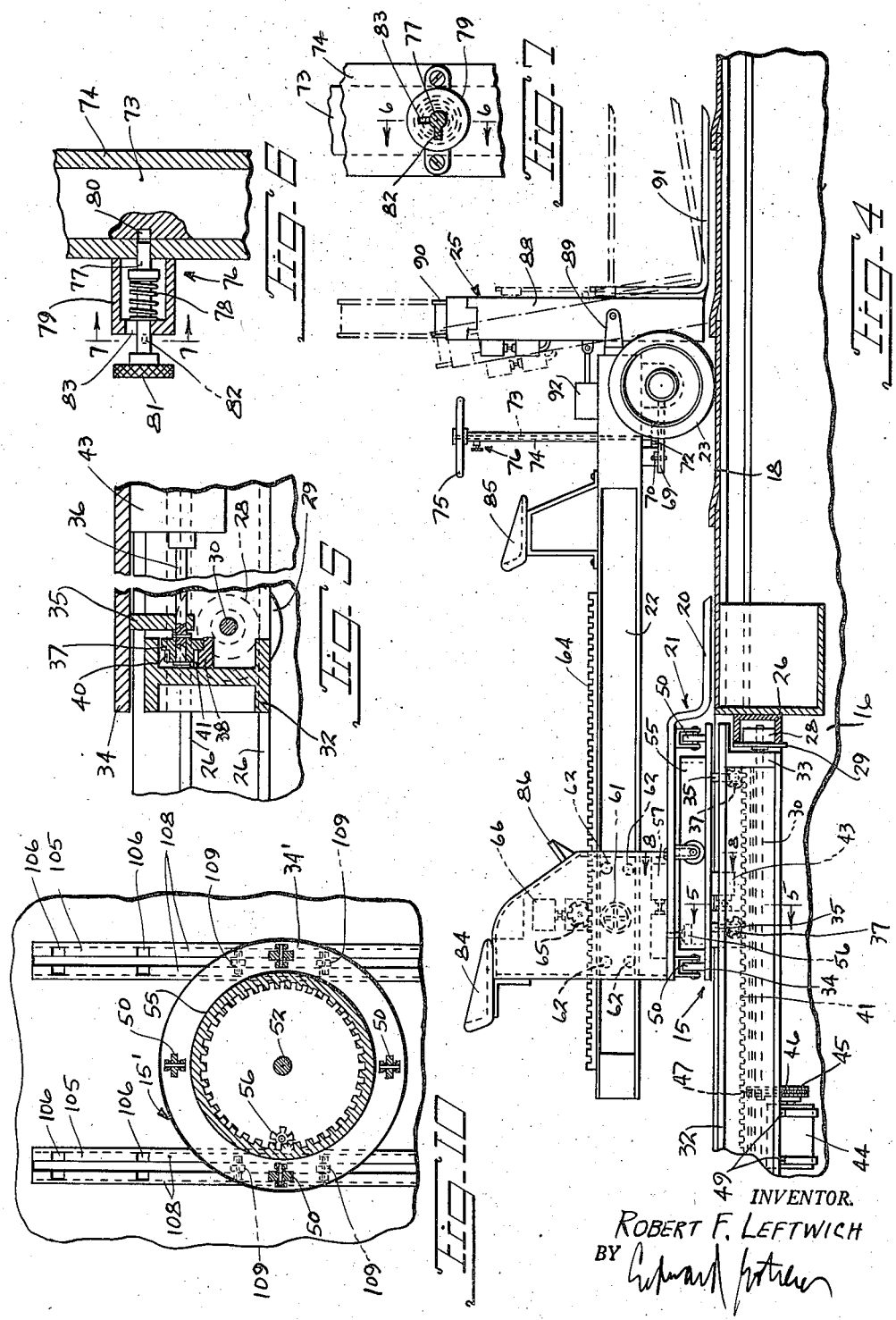

Aug. 13, 1946.   R. F. LEFTWICH   2,405,893
CARGO TRUCK
Filed Nov. 25, 1944   5 Sheets-Sheet 5
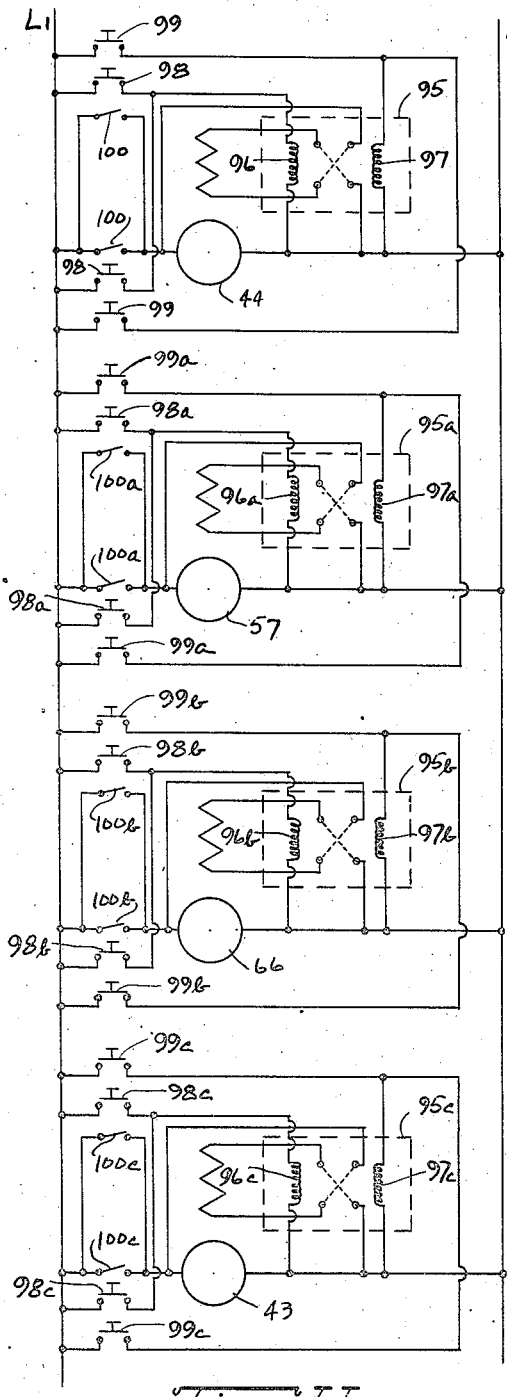
INVENTOR.
ROBERT F. LEFTWICH
BY
ATTORNEY.

Patented Aug. 13, 1946

2,405,893

UNITED STATES PATENT OFFICE 2,405,893

CARGO TRUCK

Robert F. Leftwich, Bronxville, N. Y.

Application November 25, 1944, Serial No. 565,095

11 Claims. (Cl. 214—15)

This invention relates to new and useful improvements in a cargo truck, and has more particular reference to an improved cargo truck which is capable of handling heavier loads than heretofore possible, and which is capable of moving the loads around in a new and improved fashion. The new and improved cargo truck is particularly intended for distributing cargo in the hold and between decks of ships. However, it must be clearly understood that this is one application for it, and it may be used in any number of other ways.

The new cargo truck is characterized by an undercarriage for traveling to various points, and said undercarriage is provided with a turntable having an extendable and retractable beam with its front end supported on wheels for traveling along the deck, and said beam is provided with a lift mounted on its front end.

It is proposed that the under-carriage be of such a design that it may travel along and across hatch openings of ships on a bridge spanning the hatch opening and designed to travel from end to end of a hatchway. It is proposed that it be removable so that it may be moved from one deck level in the ship to another, and then to the hold of the ship, and finally after the ship is loaded, or unloaded, it may be removed from the ship by the usual cargo handling gear and be stored on the dock, or it may be immediately used for loading or unloading another ship, or it may be stored on decks of ships and carried from port to port for loading and unloading the same ship, thus becoming a part of the ship's gear.

It is proposed that the under-carriage should ride on rails of a design which will prevent it from being lifted off the rails, except when it is desired to remove the cargo handling truck. With this arrangement the truck is capable of carrying heavier loads than any such truck of equal weight heretofore, for the simple reason that the rear end of the truck is anchored to the bridge spanning the hatch opening and thus counter balances the load on the front of the truck. Even if the under-carriage is not held down on the rails, the new cargo truck will still be able to handle heavier loads, when its beam is in its extended position, because the carriage and turnable mechanism will have a mechanical advantage in relation to the front wheels of the lift of the truck. In other words, the new truck has a variable wheel base length. It is generally recognized that the longer the wheel base of a truck the greater the load it can carry, overhanging its front, without having its rear end rising. Because of this, the cargo truck may be of a relatively light weight, and it will be able to carry much heavier loads than present day cargo or lifting trucks of the same weight. Another way of putting this, would be to point out that a cargo truck of the present day, designed to carry a very heavy load for which the new cargo truck in accordance with this invention is used will have to be very much heavier than the new cargo truck, this extra weight being located over the rear end to counterbalance the load being lifted by the forks overhanging the front wheels. Since the rear end of my truck is anchored thru the turntable to the bridge spanning the hatch opening no counterbalance is necessary.

The invention furthermore contemplates to so design the undercarriage that the cargo truck may be operated across a hatch opening, and by a small and simple interchanging of parts, it may be operated on level ground, such as in the hold of a ship.

The invention furthermore proposes to so arrange the turntable that it may turn around 360 degrees, if this is desired. It is proposed that the turntable be provided with a ledge upon which the front wheels of the beam or truck may run up on, for engaging the front wheels on the turntable. Of course, other designs may be used in this respect.

The invention also proposes to provide the turntable with a seat which we will call a back seat, from which the operator may control the cargo truck so that the operator may be close to the point where the cargo is placed upon the cargo truck when it is used across hatches of ships. The cargo handling gear merely lowers the cargo onto the fork lift of the truck, which is now in its retracted position, immediately adjacent the operator. The invention provides the cargo truck with a front seat arranged immediately behind the left of the cargo truck. It is proposed to so construct the cargo truck that it may be operated from the front seat; as well as from the rear seat. When operating from the front seat the operator has the advantage of being directly behind the load as it is being pushed around or maneuvered between the decks to be stored in its proper position, or transported to the hatch opening for removal from the ship by the deck crane.

It is proposed that the lift used on this new cargo truck to be in the nature of a hydraulic or other mechanical means of lift. For this purpose the conventional hydraulic lift may be used without alteration, particularly those having a fork for doing the lifting.

The invention also contemplates associating steering mechanism with the front wheels of the cargo truck so that the front of the beam may be steered right or left as the beam is being extended, or retracted to facilitate handling the cargo. Another advantage of providing the cargo truck with a front seat resides in the fact that the operator will then be closer to the wheels which are being steered right or left.

Still further the invention proposes the construction of a cargo truck as described, which is simple and durable and which can be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a horizontal sectional view across a ship showing one of the decks with its hatch opening, and also showing a cargo truck constructed in accordance with this invention mounted across the hatch.

Fig. 2 is a vertical sectional view through the ship, taken on the line 2—2 of Fig. 1.

Fig. 3 is an enlarged detailed view of a portion of Fig. 1, but showing the cargo truck in a slightly shifted position towards the left.

Fig. 4 is a fragmentary enlarged detailed view of a portion of Fig. 2 showing the area in which the cargo truck is located.

Fig. 5 is a fragmentary enlarged vertical sectional view taken on the line 5—5 of Fig. 4.

Fig. 6 is a fragmentary enlarged vertical sectional view of a portion of the steering column of the truck, this view being taken on the line 6—6 of Fig. 7.

Fig. 7 is a fragmentary vertical sectional view taken on the line 7—7 of Fig. 6.

Fig. 8 is a fragmentary enlarged vertical sectional view taken on the line 8—8 of Fig. 4.

Fig. 9 is a sectional view similar to Fig. 4 but illustrating a cargo truck in the hold of the ship, and showing the undercarriage replaced, for this purpose, this view representing an enlarged detailed view of the bottom portion of Fig. 2 in which the cargo truck is schematically illustrated by the dot and dash lines in its position in the hold of the ship.

Fig. 10 is a fragmentary horizontal sectional view taken on the line 10—10 of Fig. 9.

Fig. 11 is a schematic wiring diagram of the cargo truck.

The new and improved cargo truck, according to this invention, includes an under-carriage or trolley 15 for travelling to various positions across the hatch opening 16 of a ship 17. The ship 17 is shown provided with a plurality of decks 18 and with a bottom hold 19. The under-carriage or trolley 15 supports a turntable 21 which has a ledge 20 and which is provided with an extendable and retractable beam 22. Front wheels 23 are mounted upon the front of the beam 22 for travelling on the ground or floor and for supporting the front end of said beam. The wheels 23 will ride onto the ledge 20 when the beam 22 is fully retracted and then the turntable 21 may be turned any angular distance, and furthermore the under-carriage may move to any position across the hatch opening 16. The lift 25 is mounted on the front end of the beam 22.

The hatch openings 16 of the various decks 18 are provided with channel shaped tracks 26 extending along their sides. It is proposed that these tracks 26 permanently be mounted in position on the ship. The top flanges of the tracks 26 at one position, preferably at one end of the hatch opening are provided with cutouts 27 through which wheels 28 of the under-carriage 15 may pass through when the cargo truck is at the end of the hatch 16. The wheels 18 are of such a size that when they are at other positions than when they are at points beneath the openings 27, they will be held against an upward movement, and they are free only to roll along the lengths of the channels 26. The wheels 28 have flanges 29 engaging the edges of the flanges of the channels 26. The wheels 28 are fixedly mounted on shafts 30 extending transversely across and rotatively mounted on a bridge structure of the under-carriage or trolley 15, which spans the hatch opening and consists of a pair of longitudinal spaced transversely extending beams 32 connected together at their ends by transverse joining end members 33.

The under-carriage or trolley 15 also includes a small top platform 34 which is provided with bottom bearings 35 supporting longitudinally extending shafts 36 provided with wheels 37 riding on tracks 38 built along and on the opposed faces of the beams 32. These tracks 38 are located a certain distance beneath the top flanges of the beams 32, and the wheels 37 are of such a size that they ride between the top flanges of the beams 32 and the tracks 38 without appreciable upward or downward motion. The wheels 37 are provided with gear teeth 40 which mesh with rack teeth 41 extended along the tracks 38. One of the shafts 36 is connected with a reversible motor 43 by which the platform 34 may be driven transversely of the hatch 16 on the tracks 38. One of the shafts 30 is also connected with a reversible electric motor 44 for driving two of the wheels 28 by which the under-carriage or trolley 15 may be driven longitudinally along the hatch 16 on the tracks 26. The motor 44 is provided with a sprocket 45 engaged by a chain 46 which engages a sprocket 47 mounted on one of the shafts 30. The electric motor 44 is mounted across the beams 32 on supporting bars 49.

The turntable 21 is provided with a group of rollers 50 riding upon the platform 34 when the turntable is turned. The turntable 21 is rotatively supported at its center by a stud 52 which is mounted on and projects from the platform 34. A removable nut 53 is mounted on the stud 52 by which it is possible to disconnect the turntable 21 from the under-carriage or trolley 15 so that these parts may be separated. The turntable 21 is associated with means for turning it in one direction or the other. This means includes an internal ring gear 55 fixedly mounted on the platform 34 and engaged by a pinion 56 which is connected with a gear transmission and reversible motor 57 mounted on the turntable 21. When the motor 57 operates in one direction the gear 56 will turn in one direction and will rotate the turntable correspondingly, and when the motor 57 operates in the other direction, the turntable will rotate in the other direction.

The beam 22 is horizontally slidably mounted through a casing 60 mounted upon the turntable 21. This casing 60 is provided with and supports a pair of large rollers 61 rotatively supported within the casing 60 and engaging the top and bottom flanges of the beam 22 for supporting said beam. The casing 60 is also provided with and supports a group of smaller rollers 62 which also engage the flanges of the beam 22 and assist in horizontally extendably and retractably supporting said beam. However, it is proposed that there be a slight play between the rollers and the beam so that the wheels 23 on the front of the beam may move slightly upwards and downwards and follow any irregularity on a deck or floor. The beam 22 is provided with a rack 64 which is engaged by a pinion 65 connected with a gear transmission and reversible electric motor 66 mounted upon the casing 60. The arrangement is such that when the electric motor 66 operates in one direction the beam 22 will be extended and when it is operated in the other direction, the beam will be retracted.

The wheels 23 are supported by turnknuckles 68 which are connected with a steering mechanism. This steering mechanism includes arms 69 extending rearwards and connected together by a connecting rod 70. This connecting rod 70 is provided with rack teeth 71 which are engaged by a pinion 72 upon the bottom end of a steering rod 73 turnably passing through a tubular column 74. The steering rod 73 is provided with a top wheel 75 by which it may be turned. A latch 76 is provided for the purpose of latching the steering rod 73 in a position in which the wheels 23 are directed forwards. This latch 76 is in the nature of a plunger 77 which is resiliently urged inwards by a spring 78 working in a casing 79. This casing 79 is mounted on the side of the tubular column 74. The plunger 77 is capable of engaging a complementary opening 80 in the steering rod 73. The plunger 77 has an outer end provided with a knob 81. The plunger 77 also has a radial projection 82 which normally engages the end of the casing 79 for holding the plunger retracted. However, when the plunger 77 is turned so that the projection 82 passes through an opening 83 in the end of the casing 79, the plunger 77 is released, and the spring 78 will urge it inwards through the complementary opening 80 only when the wheels 23 are directed forwards.

The casing 60 is provided with a back seat 84 and foot rest 86 for an operator. The beam 22 is provided with a front seat 85 for the operator. The operator may use either seat 84 or 85. From the front seat 85 the operator may work the steering wheel 75.

The lift 25 may be a standard hydraulic lift. It is illustrated provided with a housing 88 which is pivotally mounted upon the front of the beam 22 by a bracket 89. The lift 25 has the usual hydraulic operated lifting frame 90. The lifting frame 90 is provided with the usual lifting fork 91. The hydraulic lift 25 is capable of tilting slightly backwards and forwards, in the usual way. A hydraulic cylinder 92 is illustrated mounted on the beam 22 for tilting the housing 88 forwards and rearwards. The dot and dash lines in Fig. 4 of the drawings illustrate several of the positions which the parts of the lift 25 may assume. Further details of the lift 25 will not be given in this specification since it forms no part of the invention, and lifts of these types are generally known. While a hydraulic lift has been illustrated, other types and kinds of lifts may also be used. The controls for the lift, may be placed at a convenient place for the operator to work them from the back seat 84 or the front seat 85. However, these details will not be given in this specification, since the operation and the control of the lift forms no part of this invention, and persons skilled in the art will readily know how to install the controls of the lift for properly operating the lift.

In Fig. 11 a schematic wiring diagram has been disclosed for schematically illustrating the manner in which the reversible electric motors mentioned may be controlled. Each electric motor is similarly controlled, and the arrangement may be understood by first considering the control of motor 44. This motor is shown connected with a relay controlled reversing switch 95. This relay has a coil 96 for throwing the switch in one direction and a coil 97 for throwing it in the other direction. The coil 96 is controlled by two push button switches 98 which individually control the coil, and which may be mounted respectively in the vicinity of the back seat 84 and the front seat 85. The coil 97 is controlled by two push button switches 99 which may be individually operated, and which may be located respectively at the front seat 85 and at the back seat 84 of the cargo truck. The motor 44 is also controlled by two main knife switches 100 which may be selectively operated for controlling the motor and which may be located respectfully at the two seats 85 and 84 of the cargo truck. The electric supply lines are indicated by L1 and L2.

The push button switches 98 are connected in parallel with each other, and the coil 96 is connected in series with the two switches 98 across the supply L1 and L2. Similarly, the push button switches 99 are connected in parallel, and this parallel connection is in turn connected in series with the electric motor 44 across the supply lines L1 and L2.

The reversible motors 57, 66 and 43 are controlled by switches and relays identical to those controlling motor 44 and these parts are indicated by similar reference numerals except those switches and relays used to control the motor 57 have been given exponents of the letter "a," those used to control the electric motor 66 have been given exponents of the letter "b" and those used to control the electric motor 43 have been given exponents of the letter "c."

The operation of the device is as follows:

The cargo truck, in accordance with this form of the invention, may be moved to any position along the length of the hatch 16. For example, as illustrated in Fig. 1 it may be moved to the position indicated by the dot and dash lines A at the right hand end of the hatch opening 16. The beam 22 may be extended and retracted to various positions, for example, indicated by the dot and dash lines B. In Fig. 1 the beam 22 may also be swung right or left to desirable positions indicated by the dot and dash lines C.

It is proposed that the cargo handling gear installed on the ship's upper deck be used to lower a container or load through the hatch opening and deposit it upon the fork 91. In order to do this the operator must manipulate the cargo truck so that the wheels 23 are upon the ledge 20 of the turntable 21 and the under-carriage 15 is in a position under the load. The operator getting the load may swing the turntable 21 in one direction or the other and move the under-carriage 15 to an edge section of the hatch for delivering the load. Of course, the operator must be careful in swinging the turntable and moving the undercarriage so that when the beam 22 is extended, the load will not be projected into space in the hatch opening. Even if the operator does this by accident, their will be no serious consequences as the beam 22 is supported by the rollers 61 and 62 which are designed to be capable of carrying the load. It is pointed out that the ledge 20 will extend over a substantial distance of the edge portion of the hatch opening when the under-carriage is against the side or end of the hatch which will permit a small angular projection of the beam 22, right or left, without the wheels 23 falling into space in the hatch opening. The operator extends the beam 22, and works the lift 25, so as to stack or tier the container or load in a desirable position, between the decks of the ships, or in the hold, depending upon where the operation is taking place.

Some of the advantages of the cargo truck will now be reviewed. When using the cargo truck, it is not necessary to lower the load down a hatch opening and swing it to the edge of the opening and with rollers and trucks push and drag it into position upon the deck. With the new and improved cargo truck, the load is merely lowered down on the fork 91 of the lift 25, and then is moved into any position on the deck that is desired. The cargo truck is capable of moving to any position along the length and width of the hatch opening so that it can move and deposit the load to any selected position.

When one deck has been loaded the cargo handling gear which is working on the dock simply moves the cargo truck to the next deck. After it is in its new position it is possible to continue loading. Of course, the same applies to unloading. The new cargo truck will be able to carry heavier loads in relation to its weight because the under-carriage 15 is held down counterbalancing the load on the fork. It is mounted on a track system which takes the up-thrust reaction of the load on the fork thus preventing the rear of the cargo truck from rising.

In Figs. 9 and 10, details have been shown of the dot and dash line position of the cargo truck, in the hold of the ship, as illustrated in Fig. 2. This position is shown to illustrate the way in which the cargo truck may be used on the ground, or floor or hold of a ship. It is shown used in conjunction with embedded rails. In accordance with this form of the invention, the hold 19 has embedded rails 105 extending along the length of the hold. These rails have openings 106 at one of their ends through which the wheels 107 of an under-carriage 15' may be engaged. The tracks 105 are in the nature of a pair of opposed channel-like members 108 slightly spaced from each other. The wheels 107 are mounted on bearings 109 extended downwards from the undercarriage 15'. The wheels 107 engage between the arms of the channel members 108. The under-carriage 15' is merely in the nature of a platform 34'. This platform 34' is provided with an internal ring gear 55.

In other respects this form of the invention is identical to the prior form and identical parts may be recognized by the same reference numerals. In fact the cargo truck shown in Figs. 9 and 10, is the same one shown in the prior figures except that the under carriage 15 was removed and the carriage 15' substituted for it. The under-carriage 15 is removable merely by removing the nut 53 from the stud 52. The under carriage 15' is similarly mounted in position, it being provided with a stud 52 engageable by the nut 53.

The operation of the cargo truck in the hold of the ship is identical to the operation previously described except for the fact that the under carriage 15' is not electrically driven transversely and longitudinally though of course, such operation is possible. It must be moved manually or with a truck, or mechanically to all new selected positions. After it reaches a selected position, it may be firmly held in the usual way, by wedges or by holding blocks, not shown on the drawing. These wedges or holding blocks are merely jammed in between the floor and the under carriage 15'.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new and desire to secure by United States Letters Patent is:

1. A cargo truck for a hatch opening of a ship, comprising a bridge structure for spanning said hatch opening, means for movably supporting said bridge structure for moving to various positions along said hatch opening, a platform movably mounted for moving to various positions along said bridge structure, a turntable mounted on said platform, a beam extendably and retractably mounted on said turntable, wheels on the outer end of said beam for travelling along the floor surrounding said hatch opening, and a lift mounted on the outer end of said beam and having a fork upon which loads may be lowered and raised in a vertical direction, whereby said lift may assume a position at any point of said hatch opening.

2. A cargo truck for a hatch opening of a ship, comprising a bridge structure for spanning said hatch opening, means for movably supporting said bridge structure for moving to various positions along said hatch opening, a platform movably mounted for moving to various positions along said bridge structure, a turntable mounted on said platform, a beam extendably and retractably mounted on said turntable, wheels on the outer end of said beam for travelling along the floor surrounding said hatch opening, and a lift mounted on the outer end of said beam and having a fork upon which loads may be lowered and raised in a vertical direction, whereby said lift may assume a position at any point of said hatch opening, and means for driving said bridge to various points along said hatch opening.

3. A cargo truck for a hatch opening of a ship, comprising a bridge structure for spanning said hatch opening, means for movably supporting said bridge structure for moving to various positions along said hatch opening, a platform movably mounted for moving to various positions along said bridge structure, a turntable mounted on said platform, a beam extendably and retractably mounted on said turntable, wheels on the outer end of said beam for travelling along the floor surrounding said hatch opening, and a lift mounted on the outer end of said beam and having a fork upon which loads may be lowered and raised in a vertical direction, whereby said lift may assume a position at any point of said hatch opening, and means for driving said platform to various points along said bridge.

4. A cargo truck for a hatch opening of a ship, comprising a bridge structure for spanning said hatch opening, means for movably supporting said bridge structure for moving to various positions along said hatch opening, a platform movably mounted for moving to various positions along said bridge structure, a turntable mounted on said platform, a beam extendably and retractably mounted on said turntable, wheels on the outer end of said beam for travelling along the floor surrounding said hatch opening, and a lift mounted on the outer end of said beam and having a fork upon which loads may be lowered and raised in a vertical direction, whereby said lift may assume a position at any point of said hatch opening, means for rotating said turntable.

5. A cargo truck for a hatch opening of a ship, comprising a bridge structure for spanning said hatch opening, means for movably supporting said bridge structure for moving to various positions along said hatch opening, a platform movably mounted for moving to various positions along said bridge structure, a turntable mounted on said platform, a beam extendably and retractably mounted on said turntable, wheels on the outer end of said beam for travelling along the floor surrounding said hatch opening, and a lift mounted on the outer end of said beam and having a fork upon which loads may be lowered and raised in a vertical direction, whereby said lift may assume a position at any point of said hatch opening, and said turntable being provided with a ledge upon which said wheels may rest.

6. A cargo truck, comprising an under-carriage for travelling to various longitudinal positions along the length of a hatch opening and provided with a platform and means for moving said platform to various transverse positions along the width of said hatch opening, a turntable mounted on said platform, a beam extendably and retractably mounted on said turntable and at its front end having a lift and wheels for travelling on the floor surrounding said hatch opening, and said turntable being provided with a ledge upon which said wheels may rest, whereby said lift may be supported at any point over said hatch opening.

7. A cargo truck, comprising an under-carriage for travelling to various longitudinal positions along the length of a hatch opening and provided with a platform and means for moving said platform to various transverse positions along the width of said hatch opening, a turntable mounted on said platform, a beam extendably and retractably mounted on said turntable and at its front end having a lift and wheels for travelling on the floor surrounding said hatch opening, and said turntable being provided with a ledge upon which said wheels may rest, whereby said lift may be supported at any point over said hatch opening, said ledge projecting from said turntable for extending over said floor when said platform is adjacent a side of said hatch opening.

8. A cargo truck, comprising an under-carriage for travelling to various longitudinal positions along the length of a hatch opening and provided with a platform and means for moving said platform to various transverse positions along the width of said hatch opening, a turntable mounted on said platform, a beam extendably and retractably mounted on said turntable and at its front end having a lift and wheels for travelling on the floor surrounding said hatch opening, and said turntable being provided with a ledge upon which said wheels may rest, whereby said lift may be supported at any point over said hatch opening, said ledge projecting from said turntable for extending over said floor when said platform is adjacent a side of said hatch opening, and said ledge being at an elevation which is but a slight distance above said floor so that said wheels may run up on and off of said ledge.

9. A cargo truck, comprising an under-carriage for travelling to various longitudinal positions along the length of a hatch opening and provided with a platform and means for moving said platform to various transverse positions along the width of said hatch opening, a turntable mounted on said platform, a beam extendably and retractably mounted on said turntable and at its front end having a lift and wheels for travelling on the floor surrounding said hatch opening, and said turntable being provided with a ledge upon which said wheels may rest, whereby said lift may be supported at any point over said hatch opening, channel shaped tracks for extending along said hatch opening, and said under-carriage having wheels engaging in said channel shaped tracks.

10. A cargo truck, comprising an under-carriage for travelling to various longitudinal positions along the length of a hatch opening and provided with a platform and means for moving said platform to various transverse positions along the width of said hatch opening, a turntable mounted on said platform, a beam extendably and retractably mounted on said turntable and at its front end having a lift and wheels for travelling on the floor surrounding said hatch opening, and said turntable being provided with a ledge upon which said wheels may rest, whereby said lift may be supported at any point over said hatch opening, channel shaped tracks for extending along said hatch opening, and said under-carriage having wheels engaging in said channel shaped tracks, and the flanges of said channel shaped tracks having openings at one of their end portions through which said wheels may pass for removing said under-carriage from said hatch opening.

11. A cargo truck, comprising an under-carriage for travelling to various longitudinal positions along the length of a hatch opening and provided with a platform and means for moving said platform to various transverse positions along the width of said hatch opening, a turntable mounted on said platform, a beam extendably and retractably mounted on said turntable and at its front end having a lift and wheels for travelling on the floor surrounding said hatch opening, and said turntable being provided with a ledge upon which said wheels may rest, whereby said lift may be supported at any point over said hatch opening, said turntable being fixedly connected with said platform except that it may turn.

ROBERT F. LEFTWICH.